Figure 1:
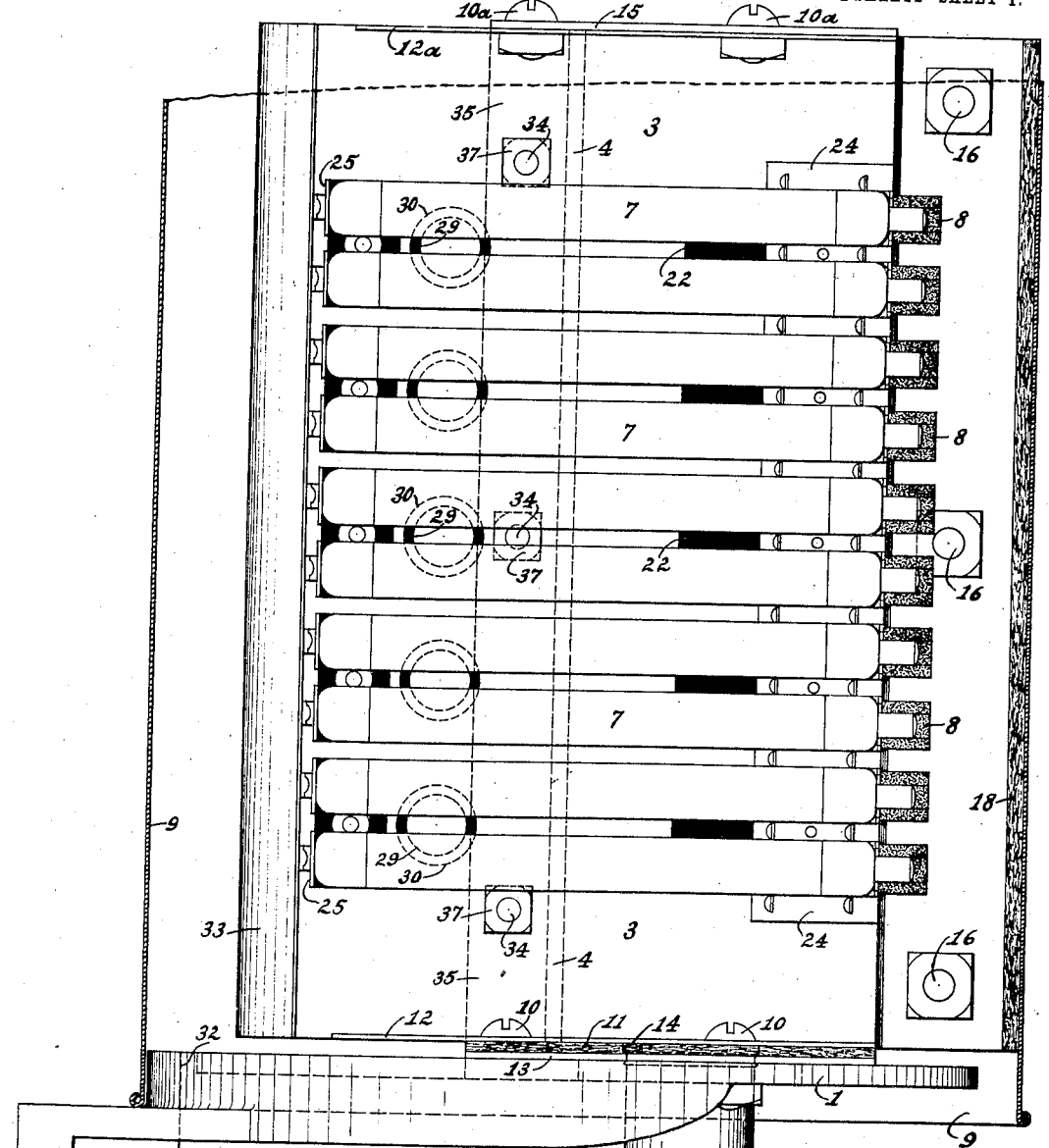

F. B. COOK.
CABLE TERMINAL.
APPLICATION FILED MAR. 1, 1909.
928,428.
Patented July 20, 1909
2 SHEETS—SHEET 2.
Fig. 2.
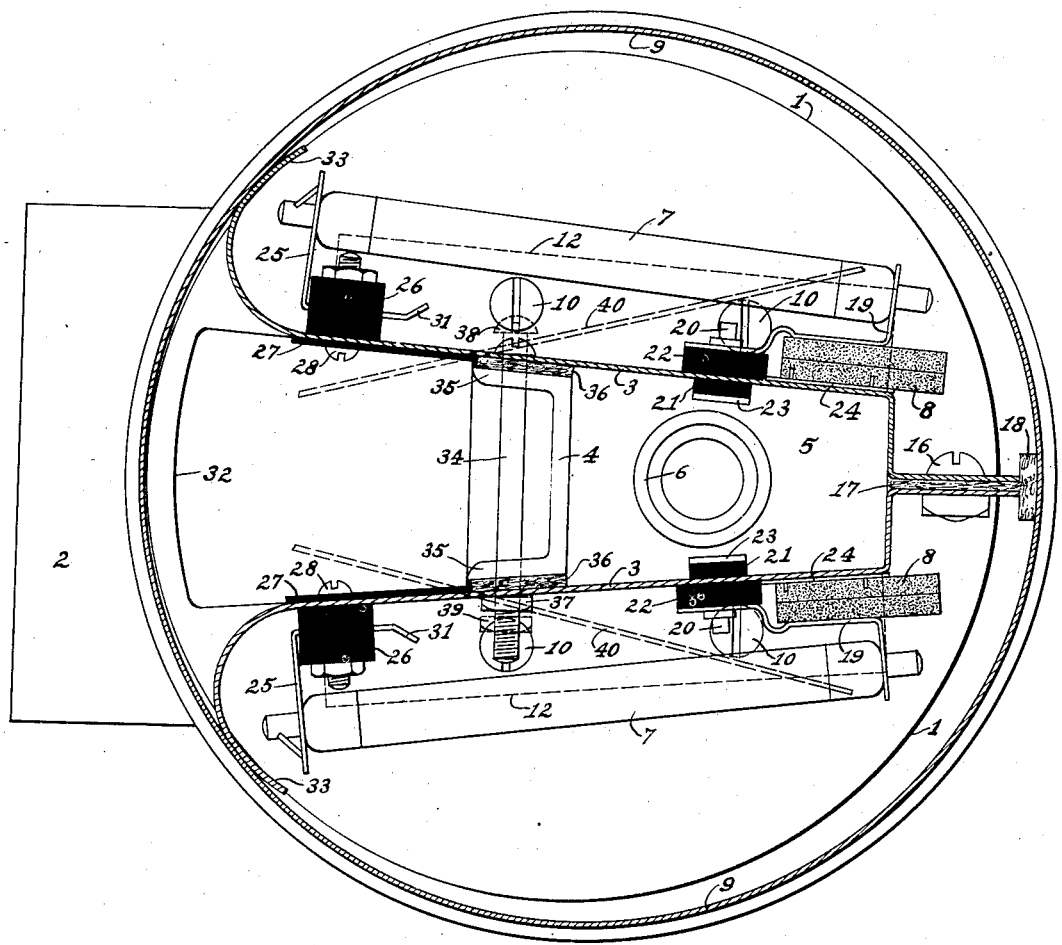
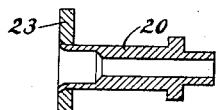
Fig. 3.
WITNESSES:
Frances K. Parker.
Maude Ball
INVENTOR:
FRANK B. COOK,
BY Frederick R. Parker
ATTORNEY.

UNITED STATES PATENT OFFICE.

FRANK B. COOK, OF CHICAGO, ILLINOIS.

CABLE-TERMINAL.

No. 928,428.

Specification of Letters Patent.

Patented July 20, 1909.

Application filed March 1, 1909. Serial No. 480,601.

*To all whom it may concern:*

Be it known that I, FRANK B. COOK, a citizen of the United States of America, residing at Chicago, in the county of Cook and State of Illinois, have invented a new and useful Cable-Terminal, of which the following is a specification, reference being had to the accompanying drawings, illustrating same.

My invention relates to terminals employed on electrical cables for distributing the conductors thereof and furnishing protection to such conductors.

The principal objects of my invention are to provide an improved and simplified construction in such a cable terminal, and to provide improved means for greatly increasing the accessibility of such a cable terminal.

Other objects will be apparent from the following specification.

In the accompanying drawings Figure 1 is a side elevation of the improved cable terminal of this invention; Fig. 2 is a plan view of the cable terminal shown in Fig. 1, with the top portions removed; and Fig. 3 is a longitudinal cross-sectional view of the hollow connecting post used in the cable terminal.

Like characters refer to like parts in the several figures.

The cable terminal comprises essentially a circular base 1 having a suitable mounting bracket 2 thereon; a pair of sheet-metal side portions 3 3 and an upright channel iron 4 forming an inclosure 5 for the cable conductors; a nozzle 6, preferably a self-soldering nozzle, extending through the base 1 and opening into the inclosure 5 to accommodate the cable leading to the inclosure 5; a series of fuses 7 7 and a series of lightning arresters 8 8 mounted on opposite sides of the sheet-metal portions 3 3, preferably as shown; and a cylindrical sheet-metal cover 9 placed over the terminal as a whole and fitting the front and rear edges of the side portions 3 3 preferably as shown. The side portions 3 3 are mounted to the base portion 1 by bolts 10 10, there being a piece of felt 11 under the flanges 12 12 of the side portions 3 3, and a plate 13 under the piece of felt 11, which plate 13 carries the nozzle 6. The felt 11 is for the purpose of forming an air-tight and moisture-tight joint around the base of the inclosure 5, and is preferably cut away as at 14 so as to give an opening from the nozzle 6 into the inclosure 5. The nozzle 6 is secured to the plate 13 by having its upper end formed out against the plate 13 as shown. The upper flanges 12ᵃ 12ᵃ of the side portions 3 3 are bolted to a top plate 15 by bolts 10ᵃ 10ᵃ, the top plate 15 covering the upper end of the inclosure 5. The front edges of the side portions 3 3 are bolted together by bolts 16 16 as shown, there being a piece of felt 17 placed between the edges of the portions 3 3 to form an air-tight and moisture-tight joint therebetween. The front edge of the felt piece 17 is preferably flattened out as at 18, to provide a bearing for the cylindrical cover 9. Spring members 19 19 are secured in place by the hollow binding posts 20 20 and are insulated from the side portions 3 3 by insulating washers 21 22 21 22 preferably as shown, the inner ends of the binding posts 20 20 being flared out against the washers 23 23 as shown in Fig. 3, to securely hold the parts together. The lightning arresters 8 8 are carried between the respective spring members 19 19 and the ground plates 24 24 which are carried by the sheet-metal side portions 3 3. The spring members 25 25 are carried by the insulating blocks 26 26 as shown, the latter, and also the insulating strips 27 27, being securely bolted to the side portions 3 3 by bolts 28 28 as shown. The insulating strips 27 27 are provided with holes 29 29 therethrough concentric with somewhat larger holes 30 30 through the side portions 3 3, to accommodate the aerial conductors leading from the terminals 31 31 through the openings 29 30 29 30 down through an opening 32 in the base plate 1 between the side portions 3 3. The rear edges of the side portions 3 3 are formed outwardly as at 33 33 to form yielding bearings for the cylindrical cover 9.

The side portions 3 3 are held together by bolts 34 34 which extend through flanges 35 35 of the channel iron 4 preferably as shown, there being strips of felt 36 36 between the flanges 35 35 and the side portions 3 3 to form air-tight and moisture-tight joints therebetween.

When it is desired to have access to the inclosure 5, the bolts 16 16, and the bolts 10 10 and 10ᵃ 10ᵃ in at least one of the side portions 3 3, are removed, and then the nuts 37 37 on the bolts 34 34 are loosened so that the heads of the bolts may take the position 38 shown in dotted lines in Fig. 2, and the nuts the position 39 shown in dotted lines in Fig. 2, whereupon either one or both of the sheet-metal side portions 3 3 may be swung outwardly on the bolts 34 34 which serve as hinges, to the positions 40 40 shown in dotted lines in Fig. 2. It will readily be seen that when the side portions 3 3 are spread outwardly to the positions 40 40, free access may be had to the inclosure 5, at the front of the terminal. The advantages arising from being able to thus spread or swing the side portions 3 3 outwardly are very apparent. When it is desired to close the head portion of the terminal, the side portions 3 3 are again moved or swung toward each other, on the bolts 34 34 as hinges, and are then bolted together as originally by bolts 16, 16. Now the bolts 10 10 10ª 10ª are again put in place so as to properly bolt the head portion to the base and close the top end of the inclosure 5.

The cable conductors entering the inclosure 5 from the nozzle 6, extend out through the hollow connecting posts 20 20 to which they are preferably soldered, the fuses 7 7 serving as connecting links to connect the cable conductors, which are electrically connected with the springs 19 19, with the aerial conductors which are connected with the spring members 25 25. It is believed that the purpose and operation of the fuses and lightning arresters is well understood without further detailed description.

It is believed that the advantages arising from making the terminal out of two formed sheet-metal side portions 3 3, as shown in the drawings, and forming an inclosed head by the aid of the channel iron 4 placed between the two sheet-metal side portions, are very apparent.

I do not wish to limit this invention to all of the particular details herein set forth, as various modifications of same may be made without departing from the scope of the appended claims.

What I claim as my invention is:

1. A cable terminal of the character described comprising a suitable base portion, a pair of side portions mounted on the said base portion, and mechanism located medially regarding the front and rear edges of the said side portions and connected to the latter whereby the front portions of the said side portions may be spread outwardly thereon when the several parts are loosened.

2. A cable terminal of the character described comprising a base portion, a pair of side portions mounted on the said base portion, the front edges of the said side portions being bolted together, and a member located medially between the said side portions and forming an inclosure with the forward portions of the said side portions, the said side portions being bolted to the said medially disposed member whereby they may be spread outwardly to open the said inclosure when the several parts are loosened.

3. A cable terminal of the character described comprising a base portion, a pair of formed sheet-metal side portions mounted on the said base portion, the front edges of the said side portions being secured practically together and the rear edges of the said side portions being formed outwardly, whereby the said edges of the side portions form three supports for a cylindrical cover, a channel-iron located medially between the said sheet-metal side portions and bolted thereto to form an inclosure with the forward portions of the said side portions, a plate closing the upper end of the said inclosure, a nozzle entering the lower end of the said inclosure, protective devices carried by the said sheet-metal side portions, and a cylindrical cover inclosing the terminal as a whole.

4. A cable terminal of the character described comprising essentially a base portion, a pair of formed sheet-metal side portions mounted on the said base portion and having their forward edges held practically together, and a channel-iron located medially between the said side portions and forming an inclosure with the forward portions thereof for accommodating cable conductors.

5. A cable terminal of the character described comprising a base portion, a pair of formed sheet-metal side portions adapted to be mounted on the said base portion, a channel-iron located medially between the said side portions and forming an inclosure therewith, the said channel-iron being bolted to the said side portions whereby the loosening of the said bolts permits the said side portions to be spread outwardly on the said bolts as hinges, to open the said inclosure of the terminal.

6. A cable terminal of the character described comprising a pair of formed side portions mounted on a suitable base and having their front edges bolted together, and a member located medially between the said side portions to provide an inclosure with the forward portions of the said side portions and a passage-way for electrical conductors with the rearward portions of the said side portions, the said medially disposed member being bolted to the said side portions whereby the latter may be spread outwardly to open the said inclosure when the several parts are loosened.

7. A cable terminal of the character described comprising a pair of formed sheet-metal side portions having the forward edges thereof secured practically together, a channel-iron located medially between the said side portions to form an inclosure with the forward portions of the said side portions and a passage-way with the rearward portions of the said side portions, protective devices carried by the said side portions, means for closing the ends of the said inclosure, means for accommodating a cable leading to the said inclosure, means for distributing the cable conductors out through the walls of the said inclosure to the protective devices, means for carrying aerial conductors from the said protective devices through the said passage-way, and a suitable cover placed over the terminal as a whole, the edge portions of the said side portions forming suitable guides for the said cover.

As inventor of the foregoing I hereunto subscribe my name this 24th day of February, 1909.

FRANK B. COOK.

Witnesses:
 FREDERICK R. PARKER,
 FRANCES K. PARKER.